July 28, 1931. L. T. ELIEL 1,816,181
METHOD OF AND APPARATUS FOR MAKING MAPS
Filed May 4, 1925 5 Sheets-Sheet 1

Fig. 1.

INVENTOR:
LEON T. ELIEL,
BY
ATTORNEY.

July 28, 1931.  L. T. ELIEL  1,816,181
METHOD OF AND APPARATUS FOR MAKING MAPS
Filed May 4, 1925  5 Sheets-Sheet 4

Fig. 8.

INVENTOR:
LEON T. ELIEL,
BY
ATTORNEY.

July 28, 1931.   L. T. ELIEL   1,816,181
METHOD OF AND APPARATUS FOR MAKING MAPS
Filed May 4, 1925   5 Sheets-Sheet 5

INVENTOR:
LEON T. ELIEL,
BY
ATTORNEY.

Patented July 28, 1931

1,816,181

UNITED STATES PATENT OFFICE

LEON T. ELIEL, OF PASADENA, CALIFORNIA, ASSIGNOR TO ELIZABETH S. ELIEL

METHOD OF AND APPARATUS FOR MAKING MAPS

Application filed May 4, 1925. Serial No. 27,712.

This invention relates to topography, and more particularly to a method and apparatus for producing accurate maps from aerial photographs.

The objects of the invention can be better comprehended if I first explain the procedure in map making by aerial photography.

It is conventional practice to photograph the territory to be mapped from an aero plane, the photographs being preferably taken at known elevations, and in a prescribed course, the successive pictures including a common area of reproduction, or what is termed an overlap. This overlap varies with respect to the particular work being done, and ranges, generally, from 40% to 70% overlap. That is to say, from 40% to 70% of one picture is duplicated in the succeeding one. The common practice of making mosaic maps from the photographs contemplates the cutting and piecing together of successive pictures, the product being a flat plan view of the territory mapped. There is no provision in mosaic map making for accurately determining and drawing contour lines. A map featuring contour lines is a necessity in many kinds of engineering, such a requirement, in fact, that a great deal of painstaking labor and expenditure of money have heretofore been employed for the purpose of making contour maps by the slow process of surveying. This practice becomes difficult and occasionally almost impossible in inaccessible territory.

An object of this invention is to provide a method and apparatus for producing accurate maps from photographs.

A further object is to provide a method and apparatus facilitating the tracing of contour lines upon aerial photographs for the purpose of producing maps.

A further object is to provide a method and apparatus whereby the illusion of a miniature relief map of territory photographed may be afforded by which the topographical features can be readily understood.

A further object is to incorporate in a method and apparatus, having the elements described, means whereby a line is caused to appear on the image of the terrain under examination, the line retaining a substantially horizontal extension, and appearing to touch the surfaces of the ground at all points, intersected by the illusionary line, which are at the same elevation or distance from and parallel to the image plane at exposure.

Another object is the provision, in the method and apparatus described, of means for varying the apparent elevation of the illusionary line to indicate different elevations under scrutiny.

The method is predicated upon principles of stereoscopic vision, whereby the common area of two aerial photographs may be caused to superimpose by means of a stereoscope, thus forming a relief image of the topography of a territory being mapped, in other words, registering an impression upon the brain as would be gained from examination of a miniature relief map.

Incorporated with the stereoscopic arrangement is a pair of parallel hair lines which are superposed over the photographs and which appear to merge into a single line when viewed through the stereoscope and appear to touch the terrain at certain elevations. By following the line with a tracing instrument, such as a pencil, all points having the same elevation and intersected by the line may be recorded by the pencil, and when the line is caused to move laterally over the photograph any contour line may be very accurately traced by following with the tracing instrument the apparent points of contact between the illusionary line and the ground surface.

Other objects and advantages will be made manifest in the following specification of an embodiment of the invention illustrated in the accompanying drawings, in which:

Fig. 6 is a vertical fragmentary sectional view of an orienting T-square mounted upon the track hereinafter referred to.

In order to facilitate an understanding of the apparatus hereinafter described, a very general outline of the procedure involved will first be given.

An aeroplane equipped with a suitable camera is flown over the territory to be mapped and photographs are taken at successive intervals, each photograph having a common overlapping area with the succeeding photograph. The intervals of exposure may be determined by any of the conventional methods for calculating proper exposure for steroscopic projection of the photographs. This, of course, involves a reference to the altitude at which the plane flies, and its speed.

Finished pictures representing a pair, that is to say, successive overlapping views, are used in conjunction with the steroparallaxer, and after a proper orientation and adjustment a tracing medium is used to describe contour lines, or to locate points at the same or different elevations, or any other utility which the apparatus may afford.

Figure 1:
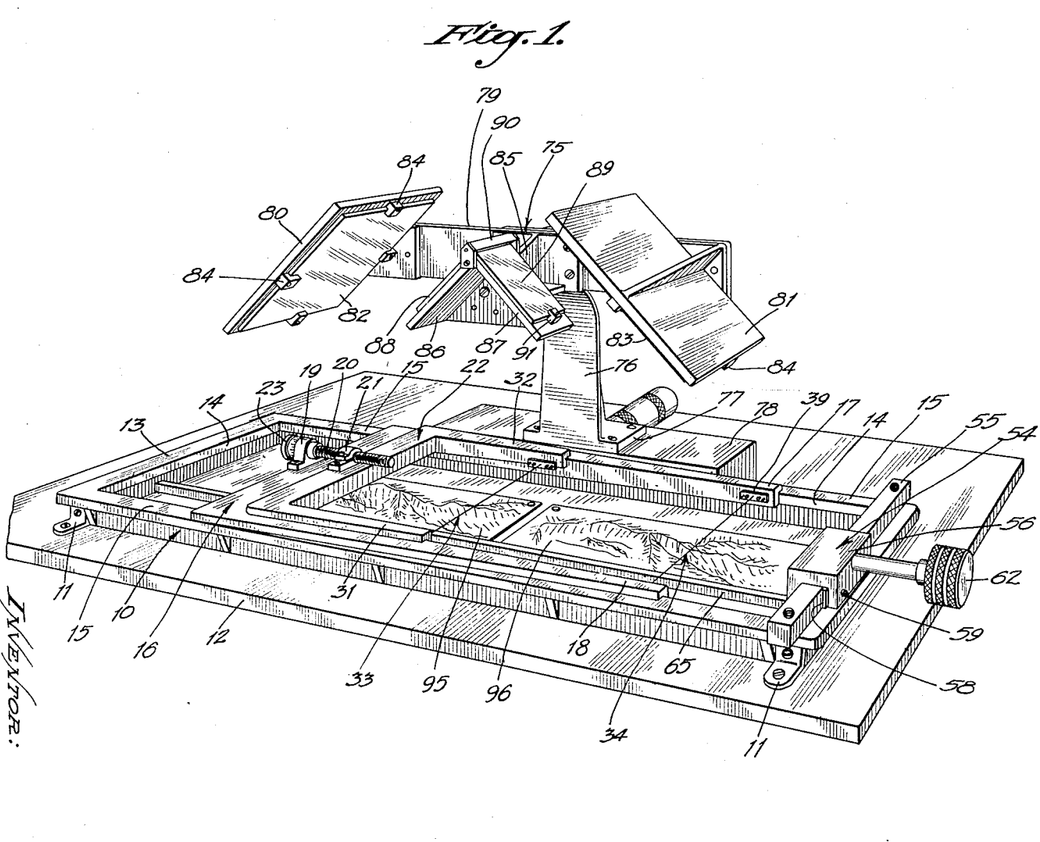
Fig. 1 is a perspective view of a form of the apparatus employed which I have elected to call a stereoparallaxer.
Figure 2:
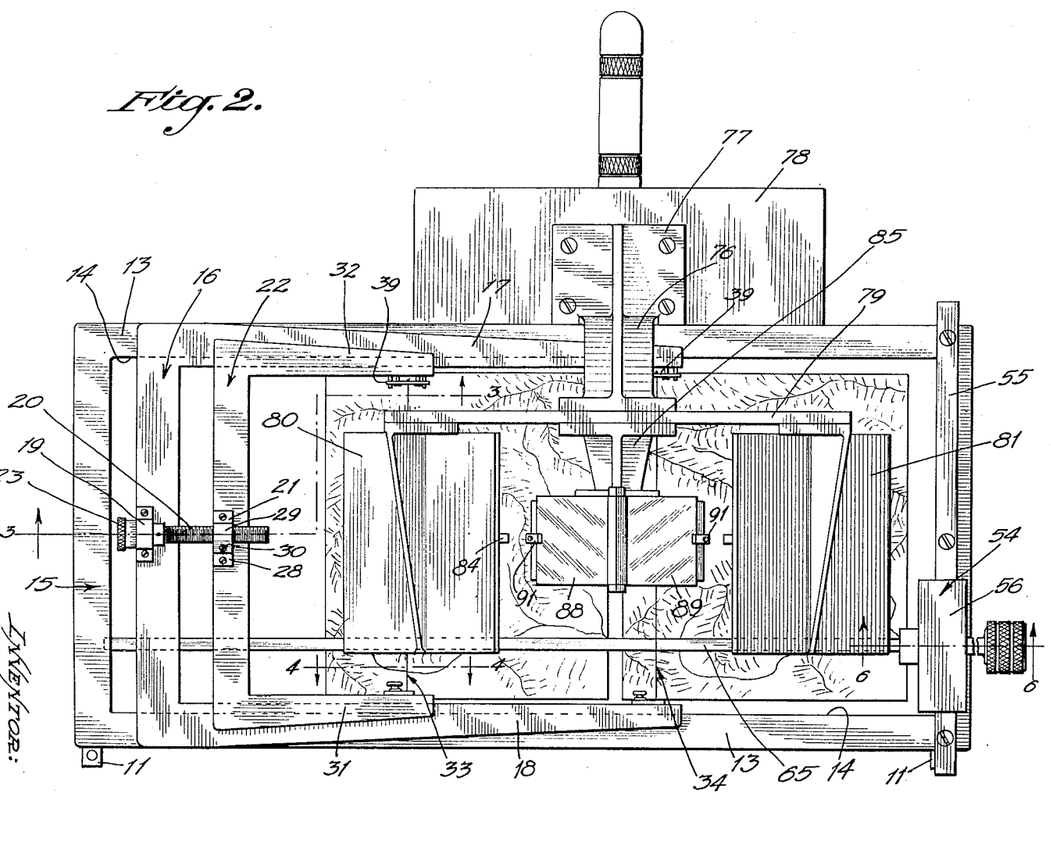
Fig. 2 is a plan view of the stereoparallaxer.
Figure 3:
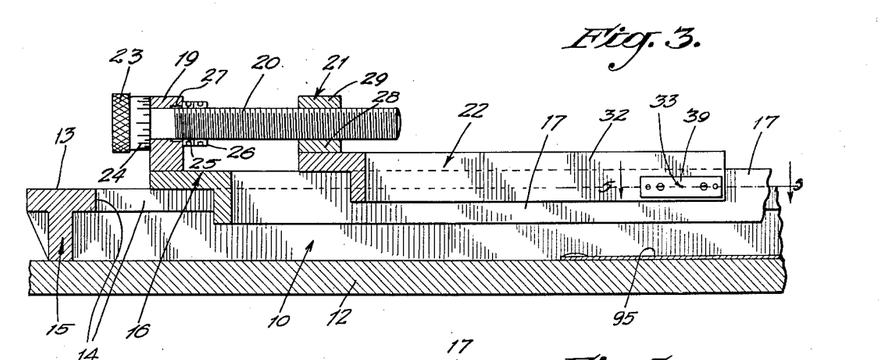
Fig. 3 is a fragmentary vertical sectional view of an adjusting device hereinafter described, being taken on the line 3—3 of Fig. 2.
Figure 4:
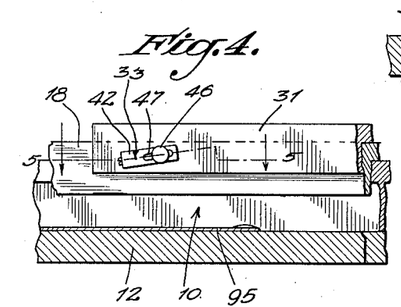
Fig. 4 is a fragmentary view partly in section of a track and hair line suspension arrangement, being taken on the line 4—4 of Fig. 2.
Figure 5:
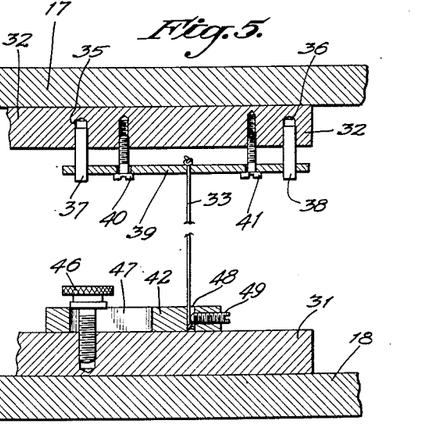
Fig. 5 is a horizontal fragmentary sectional view of the hair line suspension and adjustment hereinafter described, being taken on the line 5—5 of Figs. 3 and 4.
Figure 6:
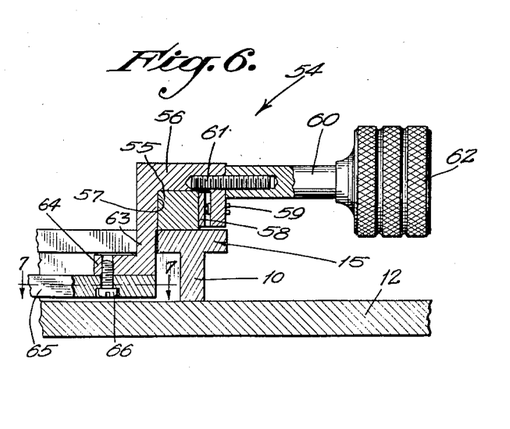
Figure 7:
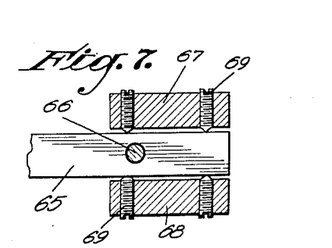
Fig. 7 is a fragmentary sectional view of the orienting square adjusting means and is taken on the line 7—7 of Fig. 6.

The form of apparatus herein disclosed comprises a rectangular base 10 which is provided with angular brackets 11, and which is suitable for mounting rigidly upon a desk or table 12. The base forms the stem of a T-shaped cross section frame (see 15, Fig. 3), the upper face 13 of which is a finished surface, the inner edges 14 being also finished. A track which may be inclusively designated as 15 is thus provided upon which a rack 16 is adapted to slide.

The rack 16 has a general U-shaped plan, its extensions, or arms, 17 and 18, being formed with L-shaped cross sections, the lower faces of the horizontal portion being adapted to slidably bear upon the upper face 13 of the track, and the vertical faces of the rack being adapted to slidably engage the inner edges 14 of the track 15.

Upon the upper face of the lateral extensions of the rack 16 is mounted a bearing 19 having a bore longitudinally of the track and rack assembly in which is carried an adjusting screw 20. The portion of the screw which is adapted to operate in the bearing is smooth and a threaded extension of the screw extends forwardly of the bearing and is adapted to be threadably received in a member 21 mounted upon a second rack 22, which is superposed upon the rack 16. The screw 20 is provided at one end with a thumb wheel 23 which is adapted to bear against one face of the bearing 19 and which may be provided with a scale 24 to facilitate fine adjustments of the screw.

A pair of annular lock washers 25 and 26 are threaded on the screw and are adapted to afford a thrust bearing to cooperate with wheel 23 for preventing longitudinal movement of the screw relative to the bearing 19. The bore of the bearing 19 may be slightly counter-sunk as at 27 to accommodate a fractional continuation of the threads.

The threaded member 21 comprises a pair of cooperating sections, the lower one 28 being securely fastened to the rack 22 and the upper section 29 being adjustable by means of a set screw 30 which may be tightened or loosened to bind the adjusting screw at any particular point or to permit of free rotation for the purpose of adjustment.

The rack 22 is similar in outline to the rack 16 and the longitudinally extending arms 31 and 32 are considerably shorter than the extensions 17 and 18 of the rack 16, and are adapted to slidably engage the upper and inner faces of the arms 17 and 18.

Each of the racks 16 and 22 have suspended between the forward ends of their extending arms a hair line, the line on the rack 22 being designated as 33 and the line on the rack 16 being designated as 34. The lines may be of very fine wire or thread or of any suitable material and should have sufficient strength to permit of reasonable tautness for the sake of accuracy. As the means of suspension and adjustment of the lines are identical on both of the racks a description of one will suffice. Small holes 35 and 36 are drilled in one of the confronting faces of the arms of each of the racks 16 and 22, and pins 37 and 38 are tightly secured therein, projecting horizontally and transversely of the track and rack assembly.

A small plate 39 of approximately rectangular dimensions and having apertures near each end thereof for the purpose of receiving the pins 37 and 38 is held substantially in position by means of screws 40 and 41 which are threaded into the arm 32. It will be seen that the plate may be moved to or from the arm 32 by adjustment of the screws 40 and 41. The line 33 is carried through a very small aperture centrally of the plate 39 and may be knotted to secure it to the plate. The opposite end of the line 33 is supported in a block 42 which is adapted to seat against the confronting face of the extending arm and is firmly secured upon the arm by a thumb screw 46. The block 42 is formed with a diagonally disposed slot 47 through which the thumb screw 46 extends and by which the block 42 may be adjusted longitudinally of the extending arm or vertically thereof. The wire 33 is held in a recess 48 by means of a set screw 49. The lines may be allowed to remain loose when the instruments are not in use and may be tightened for use by the screws 40 and 41 and very finely adjusted for parallelism with each other and for horizontal extension by loosening the thumb screws 46 and sliding the blocks 42 until the exact requirement is met whereupon the thumb screws may be tightened. It is necessary that the lines 33 and 34 be exactly parallel with each other and that they extend on a true horizontal with respect to the photographs being worked on.

A transverse guide bar 55 is rigidly secured upon the upper face of one end of the track 15 and is disposed perpendicularly to the longitudinal extension of the track. An orienting square 54 consists of a head 56 formed of a block having a longitudinal recess 57 adapted to slidably engage the guide bar 55. The recess 57 is slightly wider than the guide bar 55 and a bearing plate 58 is positioned against one of the side walls of the guide bar 55, the tension being adjusted by means of set screws 59 threaded through one wall of the head 56. A handle for the head is provided in a stem 60 having a stud 61 threaded into the head 56 and on the outer end of the stem 60 is provided an annular knurled gripping body 62. A vertical extension 63 of the square head terminates in a horizontally disposed flange 64, upon the lower face of which is mounted the orienting square straight edge 65. The straight edge 65 is secured to the flange 64 by a screw 66 and a pair of ears 67 and 68 extend downwardly at the ends of the flange 64 and approximately enclose the end of the straight edge 65. For the purpose of accurately setting the straight edge to extend parallel to the tracks 15, a series of set screws 69 are threaded laterally through the ears 67 and 68, the inner ends being adapted to bear against the faces of the straight edge. The set screws 69 may be loosened and the straight edge positioned in its exact relation to the tracks 15 and when the set screws are tightened it will be retained in rigid adjustment. The straight edge 65 is so disposed that its lower face will workably clear the surface over which it is adapted to be employed.

A stereoscope 75 positioned for reading over the track and rack assembly may consist of an upright standard 76 provided with a flanged base 77 which is mounted upon a block 78. At the upper end of the standard 76 a horizontal bracket 79 extends longitudinally with respect to the track extensions and a pair of angularly disposed cooperating mirror holders 80 and 81 are secured at the opposite ends of the bracket 79. Secured to the lower face of the mirror holders are mirrors 82 and 83 retained in place by a plurality of clips 84. The clips herein illustrated are small angular sections of material having over-lapping tongues and are secured to the mirror holders by screws. The mirrors 82 and 83 are disposed with their reflecting surfaces obliquely facing toward the track and rack assembly. A central angular support 85 extends outwardly from the bracket 79 and supports a pair of mirror holders 86 and 87. The mirror holder 86 extends in a plane parallel to the mirror holder 80 and the mirror holder 87 extends in a plane parallel to the mirror holder 81. Small mirrors 88 and 89 are secured to the upper oblique faces of the mirror holders 86 and 87 by slipping the upper edges of the mirrors under a retaining member 90 and fastening the mirrors at their lower edges by clips 91 which are similar to the clips 84. The arrangement of mirrors just described embodies principles of stereoscopic vision, this position of the mirrors being such that objects lying below the stereoscope, such as photographs, within the frame 13 will be reproduced in stereoscopic relief when viewed from above the mirrors 88 and 89. The minute adjustments necessary to properly place the photographs in the stereoscope will be presumed in this description to be satisfactorily accomplished.

The operation of the apparatus just described, and a continuation of the procedure involved in the map making, is as follows:

A pair of photographs 95 and 96 having a common overlap hereinbefore referred to are arranged upon the table 12 within the frame 13, and may be secured in place by thumb tacks or other suitable means. Before securing them it is first necessary to properly arrange the photographs relative to each other and to the stereoscope. As to longitudinal disposition of the photographs the operator should look into the mirrors 88 and 89 resting the nose bridge in proximity with the retaining member 90 so that the left eye looks into the mirror 88 and the right eye into the mirror 89. The reflected image from the two photographs may, by chance, appear in stereoscopic relief, but it is more probable that the pictures must be moved to and from each other and simultaneously on occasion longitudinally of the frame 13 until the image properly registers in the operator's mind as a single image in distinct relief.

It is further necessary that the photographs should be accurately oriented, and this may be accomplished by aligning the geometric centers of the photographs with the orienting square 54. Clearly discernible objects which appear in both pictures should next be chosen and the pictures revolved upon their geometric centers until the two images of the same object also align with the orienting square. Care must be exercised in this adjustment to choose an object, the two images of which appear at different radial distances from their respective geometric centers for if both points of the several pairs used in this adjustment happened to be equidistant from the center a false orientation might occur. For the purpose of visual reproduction then, the pictures will be correctly disposed and the image reflected by the stereoscope will be accurate.

The operator should then move the rack 16 and consequently the rack 22, the two being in rigid relationship due to the adjusting screw 20, until the lines 33 and 34 appear approximately over the ground which it is desired to reproduce on the map.

The thumb wheel 23 should then be rotated one way or the other, which causes the rack 22 to slide upon the rack 16 and consequently the lines 33 and 34 to be brought nearer each other, or farther apart.

There is a certain relationship, or distance of separation, of the two lines, at which they will appear to merge when viewed through the stereoscope into a single line extending transversely of the terrain being viewed, and furthermore, the apparently single line will seem to touch the surface of the ground at certain points, to bridge depressions, and to cut through objects of high elevations. Consequently, when the lines are separated certain distances all objects of the same elevation will appear to be touched by the line extending transversely of the image seen. When the rack 16 carrying the rack 22 is moved along the track 15 this visionary line will retain its identity and its apparent fixed elevation as it passes over successive sections of territory and the operator may, by using a tracing instrument, such as a pencil, follow one of the actual suspended lines and reproduce on the photograph under that particular line the true contour line as described by the visionary line touching the points of equal elevation.

There are several methods by which the proper setting of the hair lines may be accomplished to give a definite contour line. The simplest method calls for the location on the picture either by markers placed on the ground in advance of the flying or by the location of objects showing in the picture subsequent to the flying, of two known elevations. By first setting the hairs on one of these elevations and then on the second, and reading the scale on the adjusting screw, interpolation of any other elevation can be easily computed.

If it is possible from known data to determine the exact separation between points of exposure of the two pictures and the exact elevation at which they were exposed, then by simple computation it may be determined at what necessary distance the hair lines should be separated to give the required contour line.

For the most precise work, it would be necessary to use this instrument in the measurement of the negatives; or positives corrected for inclination at the time of the exposure. In making such a use of this instrument the plates being measured would rest on a ground glass immediately beneath this instrument being visible by light reflected through from the bottom, coming either from a daylight source and mirrors, or from incandescent lights properly diffused.

The corrections for tilt or inclination of the plate at the time of exposure from the true horizontal may be made by any of the recognized methods in common use in the construction of aerial maps and their adaptation.

Figure 8:
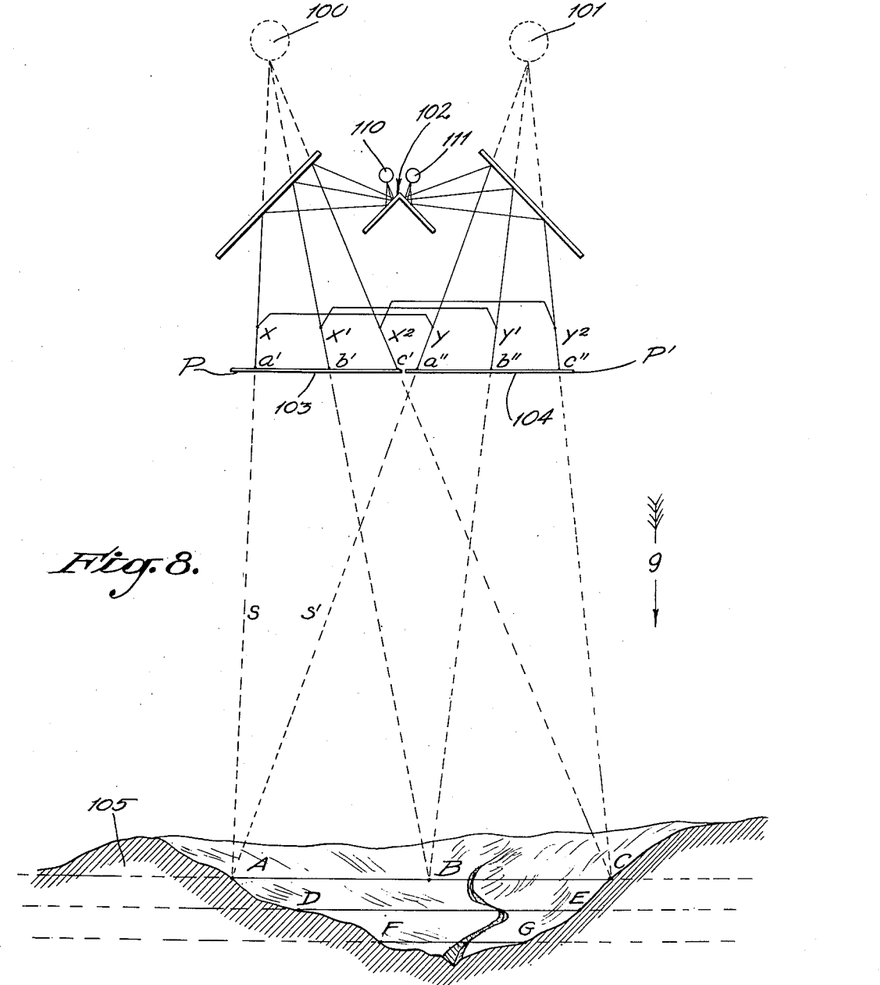
Fig. 8 is a diagrammatic view including a section of terrain illustrating the principle upon which the method and apparatus operate.
Figure 9:
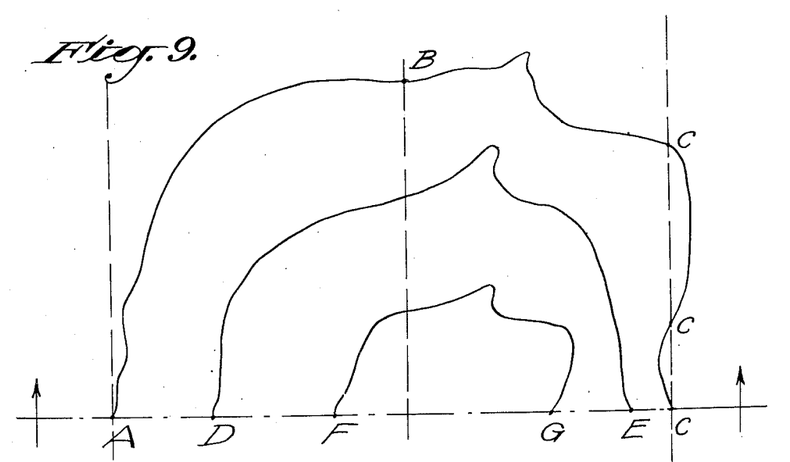
Fig. 9 is a plan view of the terrain shown in Fig. 8 and includes a series of contour lines.
Figure 10:
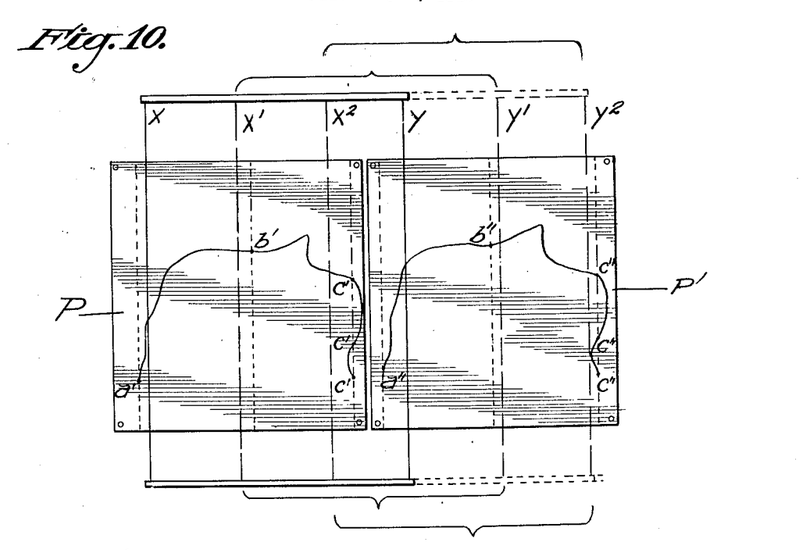
Fig. 10 is a plan view of the photographs and lines of sight shown in Fig. 8, and includes diagrammatic illustration of the projection of the hair lines.

The principle of this illusion which affords an accurate method of ascertaining contours may be readily understood by referring to Figs. 8, 9 and 10. For the sake of illustration imagine an inter-ocular monstrosity, such as would be represented by eyes 100 and 101. That is to say, imagine a pair of eyes widely separated as shown in this figure. In practice these would be the successive positions of the camera lens. For the moment ignore the stereoscope 102 diagrammatically represented and also the photographs P and P'. Let the line of sight fall directly to the earth, a section of which is shown at 105. Now, this section represents the head of a canyon. Interpose a line $x$, here shown in cross section, in the line of sight S which terminates at point A, which is one elevation on the contour of the head of the canyon shown. Let the eye 101, by the line of sight S', intersected by a transverse line $y$, see the same point A. ABC represents a contour line. Now, move the line of sight gradually across the surface, retaining the transverse lines $x$ and $y$ in established parallel relationship, that is, always equidistant. All points on the contour line ABC will be seen at the intersection of the lines of sight. Thus point B will be seen when the lines of sight pass through the transverse lines $x$ and $y$ at $x'$ and $y'$ and point C will be seen when the lines of sight pass through the transverse lines $x$ and $y$ at $x^2$ and $y^2$. Since the transverse lines $x$ and $y$ extend fully across a given territory the contour line ABC may be followed very minutely.

It should be obvious that when the transverse lines $x$ and $y$ are separated a greater distance the lines of sight will intersect at a greater distance, or depth, and a contour line of lower elevation may be described, such as DE. Separate the transverse lines $x$ and $y$ still more, and contour line FG may be traced.

Now, applying this principle to the photographs and stereoscope shown in Figs. 8 and 10, it will be observed that the transverse lines heretofore described and the lines of sight are proportionately on the photographs as they were on the earth's surface. The stereoscope, whose principle of operation is established, by reflecting the light rays S and S' to the small mirrors and thence to the eyes of the operator, afford the operator the same visionary effect as if he were seeing the actual terrain through eyes 100 and 101. Consequently, when the left eye 110 of the operator sees through transverse line $x$, a point $a'$ on the photograph P corresponding to point A on the earth, his right eye 111 sees through transverse line $y$ the point $a''$ on photograph P', this point $a''$ also corresponding to point A.

Referring to Fig. 10, the specific method of tracing the contour lines may be understood. The projection of each pair of transverse lines $x$ and $y$, $x'$ and $y'$ and $x^2$ and $y^2$ appear successively in the dotted lines on which the points of elevation $a'$ and $a''$, $b'$ and $b''$, and $c'$ and $c''$ are located. The operator may follow the contour line thus appearing, on either of the photographs P or P', the result being illustrated as a contour line $a''b''c''$ at the head of a canyon.

Because of the fact that contour lines representing various elevations will appear in the photographs at varying scales dependent on the distance of the respective contours from the point of exposure, a correction must be applied to these contours as sketched on the photographs by this instrument in order to reduce them to a common scale before completing a map.

I claim as my invention:

1. An apparatus to be used in map making comprising, in conjunction with a pair of photographs of territory to be mapped having a common overlap area: a stereoscope arranged for viewing said photographs; a pair of hair lines; means for interposing said pair of hair lines between said stereoscope and said photographs, and means whereby said hair lines may be moved laterally of their longitudinal extension at the same time being retained at a constant distance of separation.

2. An apparatus to be used in map making comprising, in conjunction with a pair of photographs of territory to be mapped having a common overlap area: a stereoscope arranged for viewing said photographs; a pair of hair lines; means for interposing said pair of hair lines between said stereoscope and said photographs; means whereby said hair lines may be moved laterally of their longitudinal extension at the same time being retained at a constant distance of separation; and means including an orienting straight edge for orienting photographs with respect to the said stereoscope.

3. An apparatus to be used in map making comprising, in conjunction with a pair of photographs of territory to be mapped having a common overlap area: a stereoscope arranged for viewing said photographs; a pair of hair lines; and means for interposing said pair of hair lines between said stereoscope and said photographs in a position relatively close to said photographs whereby said hair lines may be viewed as a single visual line intersecting a point in an image of said territory in relief seen through said stereoscope.

4. A method of indicating contours, said method comprising: examining stereoscopic photographs of a surface under a stereoscope so that an image of said surface in relief appears to the observer; interposing hair lines between the photographs and the observer so that an image of a single line appears to the observer which cuts the image of said surface in relief at a point; and moving said hair lines to cause said line image to cut said surface image on a line.

5. A method of indicating contours, said method comprising: examining stereoscopic photographs of a surface under a stereoscope so that an image of said surface in relief appears to the observer; interposing hair lines between the photographs and the observer so that an image of a single line appears to the observer which cuts the image of said surface in relief at a point; and adjusting the spacing of said hair lines to determine any desired elevation of said line image relative to said relief image.

6. A method of indicating elevations on a likeness of a surface, comprising: examining stereoscopic likenesses of said surface under a stereoscope so that an image of said surface in relief appears to the observer, said likenesses having a common overlap containing two points of known elevation; utilizing a pair of parallel hair lines for creating an illusionary line apparently intersecting one of said points of known elevation; changing the separation of said hair lines by a measured amount until said illusionary line apparently passes through the other of said points of known elevation; and using this measured amount of movement of said hair lines as a basis for interpolation to secure the elevation of other points.

7. An apparatus to be used in making maps, comprising in conjunction with a pair of photographs having a common overlap area: a base for retaining said photographs; a stereoscope arranged for viewing said photographs in stereoscopic relationship; a pair of hair lines; and rack means slidable on said base for retaining said hair lines in parallel relation and for moving said hair lines in a plane parallel to said photographs.

8. An apparatus to be used in making maps, comprising in conjunction with a pair of photographs having a common overlap area: a base for retaining said photographs; a stereoscope arranged for viewing said photographs in stereoscopic relationship; a rack slidable along said base in a given direction; a second rack movable relative to said base in said given direction; a hair line mounted in each of said racks, said hair lines being parallel and lying in a plane between said stereoscope and said photographs; and adjusting means engaging said racks for varying the spacing of said hair lines.

9. An apparatus to be used in making maps, comprising in conjunction with a pair of photographs having a common overlap area: a base for retaining said photographs; a stereoscope arranged for viewing said photographs in stereoscopic relationship; a rack slidable in a given direction along track means formed by said base; a second rack slidable along track means formed by said first named rack; a hair line mounted in each of said racks, said hair lines being parallel and lying in a plane between said stereoscope and said photographs; and a means for accurately measuring the relative position of said racks as an indication of the spacing of said hair lines.

10. A combination as defined in claim 7, including guide means on said base and substantially parallel to said hair lines, and an orienting means slidable along said guide means and extending above said photographs for orienting said photographs relative to said stereoscope.

In testimony whereof, I have hereunto set my hand at Los Angeles, California, this 27th day of April, 1925.

LEON T. ELIEL.